US012664174B2

(12) United States Patent
Gupta et al.

(10) Patent No.: US 12,664,174 B2
(45) Date of Patent: Jun. 23, 2026

(54) DATA PERSISTENCE FORMATS MANAGEMENT FOR COLUMN LOADABLE COLUMNS

(71) Applicant: SAP SE, Walldorf (DE)

(72) Inventors: Ishita Gupta, Bangalore (IN); Janardhan Hungund, Pune (IN); Amit Saonerker, Pune (IN); Jagadeesha Kanihal, Bengaluru (IN); Amit Pathak, Pune (IN); Sebastian Seifert, Heidelberg (DE); Bernhard Scheirle, Leimen (DE); Neha Shikha Kachhap, Ranchi (IN)

(73) Assignee: SAP SE, Walldorf (DE)

( * ) Notice: Subject to any disclaimer, the term of this patent is extended or adjusted under 35 U.S.C. 154(b) by 93 days.

(21) Appl. No.: 18/530,056

(22) Filed: Dec. 5, 2023

(65) Prior Publication Data

US 2025/0181601 A1 Jun. 5, 2025

(51) Int. Cl.
*G06F 16/25* (2019.01)
*G06F 16/22* (2019.01)
(52) U.S. Cl.
CPC .......... *G06F 16/258* (2019.01); *G06F 16/221* (2019.01)

(58) Field of Classification Search
CPC ................. G06F 16/258; G06F 16/221; G06F 11/1076; G06F 3/0619; G06F 3/0638; G06F 8/4434; G06F 16/1794
See application file for complete search history.

(56) References Cited

U.S. PATENT DOCUMENTS

| | | | |
|---|---|---|---|
| 10,001,944 B2 * | 6/2018 | Luby ................... | G06F 11/1088 |
| 2017/0177604 A1 * | 6/2017 | Geissinger ............ | G06F 8/4434 |

* cited by examiner

*Primary Examiner* — Ajay M Bhatia
*Assistant Examiner* — Berhanu Mitiku
(74) *Attorney, Agent, or Firm* — Mintz Levin Cohn Ferris Glovsky and Popeo, P.C.

(57) ABSTRACT

A system for managing data persistence formats in a computing system, comprising, at least one data processor; and at least one memory result in operations comprising: computing an estimated serial size (ES) for a dataset; computing an estimated unified size (EU) for the dataset; selecting, based at least in part on a predefined set of rules, between a serial persistence format and a unified persistence format to store the dataset, wherein the selection is based at least in part on the computed estimated serial size and the computed estimated unified size; storing the selected persistence format in a metadata associated with the stored dataset; and in response to a loading request, loading the stored dataset by referring to the metadata.

17 Claims, 9 Drawing Sheets

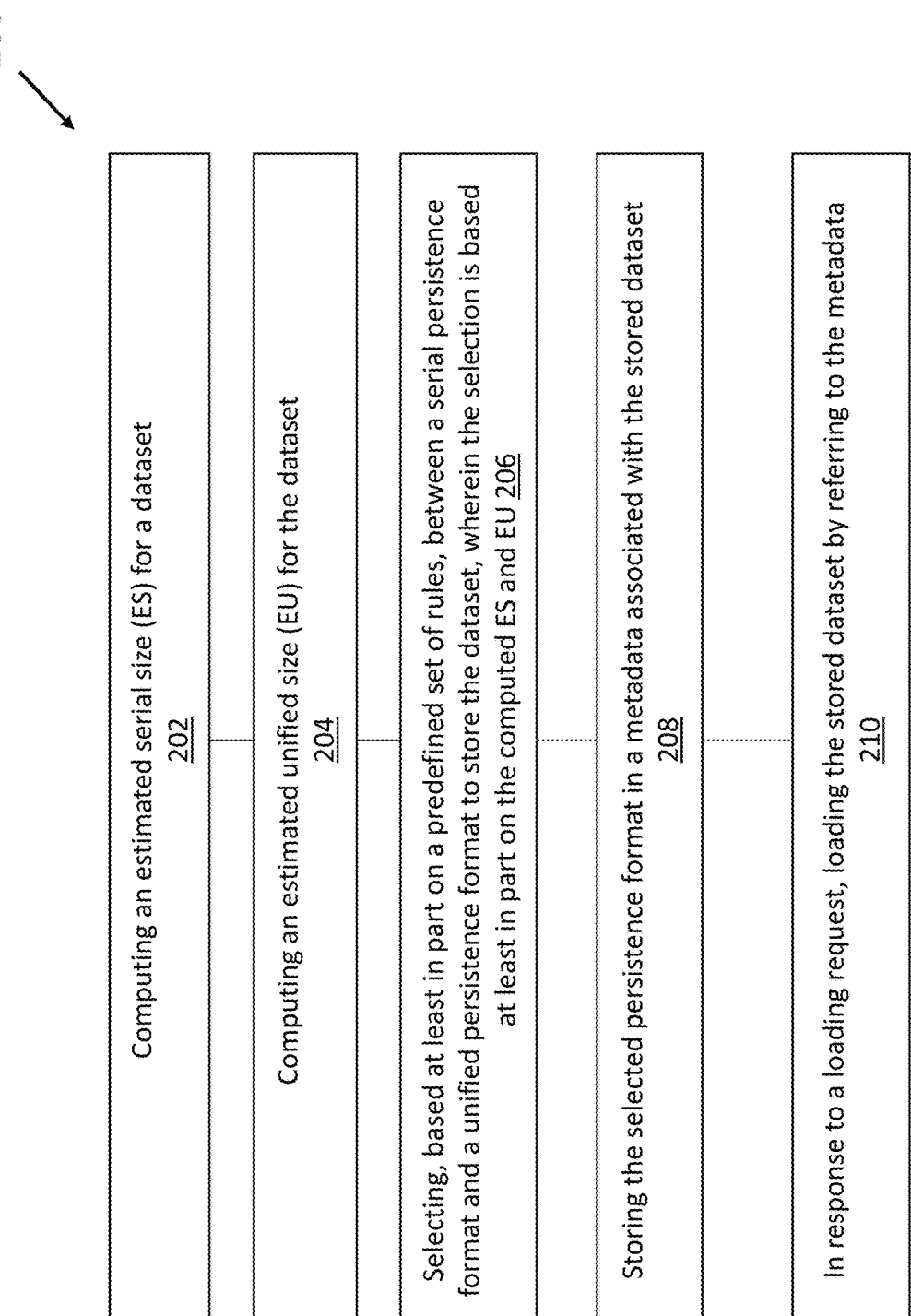

Computing an estimated serial size (ES) for a dataset
202

Computing an estimated unified size (EU) for the dataset
204

Selecting, based at least in part on a predefined set of rules, between a serial persistence format and a unified persistence format to store the dataset, wherein the selection is based at least in part on the computed ES and EU 206

Storing the selected persistence format in a metadata associated with the stored dataset
208

In response to a loading request, loading the stored dataset by referring to the metadata
210

900

SELECT * FROM SYS.M_CS_COLUMNS_PERSISTENCE WHERE table_name = 'SINGLEROWTABLE';

Rowid column without "DATA PERSISTENCE FORMATS MANAGEMENT FOR COLUMN LOADABLE COLUMNS"

902

904

| TABLENAME | PARTID | COLUMNID | COLUMN_NAME | PERSISTENCE_TYPE | MAIN_PHYSICAL_SIZE | MAIN_PHYSICAL_SIZE_IN_PAGE_LOADABLE |
|---|---|---|---|---|---|---|
| SINGLEROWTABLE | 0 | 201 | A | UNIFIED | 4,096 | 0 |
| SINGLEROWTABLE | 0 | 7 | $rowids | UNIFIED | 8,192 | 4,096 |

Rowid column with "DATA PERSISTENCE FORMATS MANAGEMENT FOR COLUMN LOADABLE COLUMNS"

906

908

| TABLENAME | PARTID | COLUMNID | COLUMN_NAME | PERSISTENCE_TYPE | MAIN_PHYSICAL_SIZE | MAIN_PHYSICAL_SIZE_IN_PAGE_LOADABLE |
|---|---|---|---|---|---|---|
| SINGLEROWTABLE | 0 | 201 | A | UNIFIED | 4,096 | 0 |
| SINGLEROWTABLE | 0 | 7 | $rowids | UNIFIED | 4,096 | 0 |

FIG. 9

DATA PERSISTENCE FORMATS MANAGEMENT FOR COLUMN LOADABLE COLUMNS

TECHNICAL FIELD

The subject matter described herein relates generally to managing data persistence formats for column loadable columns.

BACKGROUND

Managing data persistence formats in modern computing systems poses challenges in optimizing storage utilization and retrieval performance. Traditional methods may lack flexibility for diverse data components within datasets, especially when dealing with column-based data storage. Varied column sizes result in inefficiencies, where a uniform persistence strategy can lead to space consumption and retrieval bottlenecks. Conventional solutions often involve fixed persistence strategies that overlook the variability of data components.

SUMMARY

A dynamic approach is needed, considering factors like column size, dataset size, and performance requirements. Provided herein are systems and methods for managing data persistence formats, by dynamically selecting data persistence formats to store one or more dataset. This may involve accurate size estimation of components, defining thresholds, and selecting the optimal format while adhering to predefined rules. Achieving this balance and implementing the dynamic selection process is technically demanding. Hence, an improved method and system are needed that dynamically select data persistence formats for efficient column-based data storage. The present subject matter offers a solution for space efficiency and data retrieval performance in computing systems.

Systems, methods, and articles of manufacture, including computer program products, are provided for object-based text searching using group score expressions. In one aspect, there is provided a system. The system may include at least one data processor and at least one memory. The at least one memory may store instructions that result in operations when executed by the at least one data processor. The operations may include: computing an estimated serial size (ES) for a dataset; computing an estimated unified size (EU) for the dataset; selecting, based at least in part on a predefined set of rules, between a serial persistence format and a unified persistence format to store the dataset, wherein the selection is based at least in part on the computed estimated serial size and the computed estimated unified size; storing the selected persistence format in a metadata associated with the stored dataset; and in response to a loading request, loading the stored dataset by referring to the metadata.

In some variations of the methods, systems, and non-transitory computer readable media, one or more of the following features can optionally be included in any feasible combination.

In some variations, a page-loadable format for loading the stored data set is available if the selected persistence format for the stored dataset is the unified persistence format, and the page-loadable format for loading the dataset is not available if the selected persistence format for the dataset is the serial persistence format.

In some variations, the predetermined set of rules includes: a determination of whether the ES is less than a minimum size threshold for unified storage, and if so, selecting the serial persistence format; a determination of whether the ES is greater than a maximum size threshold for serial storage, and if so, selecting the unified persistence format; a comparison of the ES and the EU, and selecting the unified persistence format if the ES is greater than the EU; and a calculation of a percentage difference between the ES and the EU, and selecting the unified persistence format if the percentage difference is within a predetermined threshold.

In some variations, the operations further includes: detecting a scenario where the minimum size threshold for unified storage is greater than the maximum size threshold for serial storage; and generating a reconfiguration request for dynamic format selection.

In some variations, the dataset includes columns and components of columns, and the selection of the persistence format is determined independently for each component.

In some variations, the operations further include determining if a dictionary component of the dataset has a size that is below a dictionary sized threshold, and storing the dictionary component to serial persistence format in response to the size below the dictionary size threshold.

In some variations, the predefined set of rules includes identifying small columns based on predetermined thresholds for column sizes.

A computer-implemented method may include: computing an estimated serial size (ES) for a dataset; computing an estimated unified size (EU) for the dataset; selecting, based at least in part on a predefined set of rules, between a serial persistence format and a unified persistence format to store the dataset, wherein the selection is based at least in part on the computed estimated serial size and the computed estimated unified size; storing the selected persistence format in a metadata associated with the stored dataset; and in response to a loading request, loading the stored dataset by referring to the metadata.

A non-transitory computer-readable medium storing instructions, which when executed by at least one data processor, result in operations including: computing an estimated serial size (ES) for a dataset; computing an estimated unified size (EU) for the dataset; selecting, based at least in part on a predefined set of rules, between a serial persistence format and a unified persistence format to store the dataset, wherein the selection is based at least in part on the computed estimated serial size and the computed estimated unified size; storing the selected persistence format in a metadata associated with the stored dataset; and in response to a loading request, loading the stored dataset by referring to the metadata.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts an example flowchart illustrating a process for managing persistence format, according to one or more embodiments of the present disclosure;

FIG. 9 depicts a comparison between an implementation without the data persistence formats management functionality and an implementation with the data persistence formats management functionality, according to one or more embodiments of the present disclosure.

When practical, similar reference numbers denote similar structures, features, or elements.

DETAILED DESCRIPTION

Figure 1:
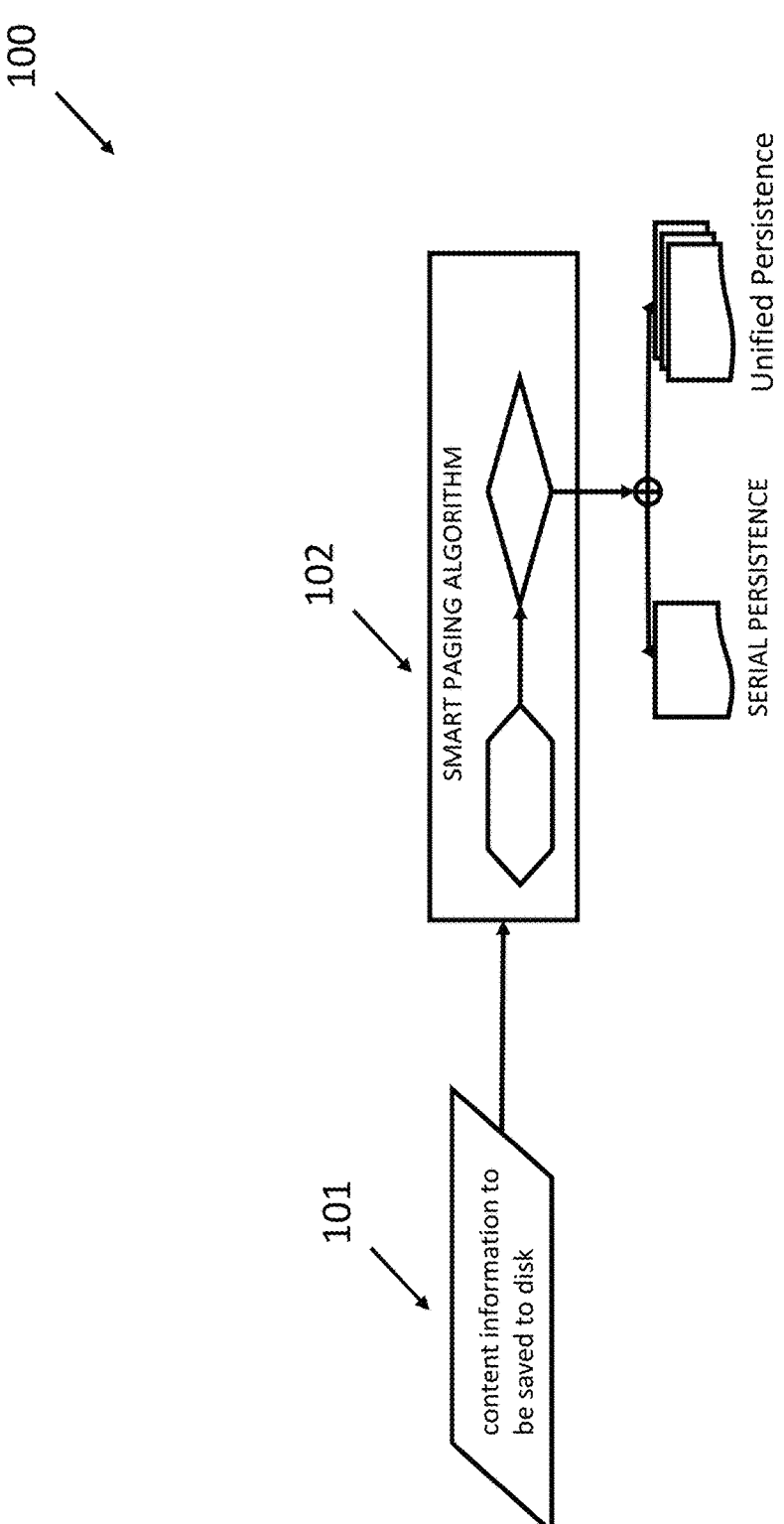
FIG. 1 depicts a diagram illustrating a persistence format management process, according to one or more embodiments of the present disclosure.

FIG. 1 depicts a diagram illustrating a high-level persistence format management process 100, according to one or more embodiments of the present disclosure. As shown in FIG. 1, the dataset to be saved to disk 101, i.e., the content information to be save to disk, may be analyzed by smart paging algorithm 102. The smart paging algorithm 102 may comprise, Machine Learning algorithms, Threshold-based algorithms, Size Ratio algorithms, Size Difference algorithms, Probabilistic algorithms, etc. The smart paging algorithm 102 may determine the persistence format for saving the incoming dataset 101, for example, between serial persistence format and unified persistence format. Serial persistence and unified persistence are two different persistence formats for storing data in computing systems, and they may serve different purposes and offer varying advantages based on the characteristics of the data being stored. Serial persistence may involve storing data components in a sequential manner, typically in a single page chain. For example, serial persistence format may be suitable for scenarios where data components are relatively small and can be efficiently stored together in a single chain. It is often used for smaller datasets or columns with limited data volume and offers advantages such as compact storage and faster access of the dataset. Unified persistence, on the other hand, involves storing data components individually in separate page chains. This format is more suitable for larger and more complex datasets, where components may vary significantly in size. Unified persistence allows each data component to be stored optimally and independently from each other, considering its specific size and characteristics. It offers advantages such as improved performances, and the ability to load the stored data in a column-loadable format, which is not available if the dataset was saved in a serial persistence format. The smart paging algorithm 102 may analyze a number of factors, such as data characteristics, dataset size, retrieval patterns, and storage efficiency goals, and determine which format to choose for storing the incoming data set 101.

In a column-oriented format, data is stored in columns rather than rows. This allows for efficient data retrieval and analysis, particularly in scenarios where specific columns need to be accessed or aggregated. Such columnar storage is advantageous in tasks like historical data analysis and batch processing, where selective access to specific attributes is common. This arrangement reduces storage overhead, especially when dealing with numerous records, as it optimizes data access for specific data elements within the columns. In contrast, a unified persistence format stores data components individually in separate page chains, tailoring storage to the specific needs of each component.

In the unified format, each data component—is stored separately according to its size and retrieval patterns. As discussed herein elsewhere, a table's single column may include three primary elements: Data Vector, Dictionary, and Inverted Index. Those components, in some embodiments, may not be logical data parts, but instead, may be specific internal representations. The Dictionary holds the column's distinct values. The Data Vector establishes a connection between the row's position and the dictionary's value. Meanwhile, the Inverted Index links the dictionary index to specific row positions. For each of these elements, a decision is made on whether to store them in serial or paged persistence. The following example may illustration one instance of the approaches herein:

| Column as seen via SQL, e.g. containing cities: | |
| --- | --- |
| Row | Value |
| 1 | London |
| 2 | Berlin |
| 3 | London |

| Dictionary: | |
| --- | --- |
| Index | Value |
| 0 | London |
| 1 | Berlin |

| Data Vector: | |
| --- | --- |
| Row | Dictionary Index |
| 1 | 0 |
| 2 | 1 |
| 3 | 0 |

| Inverted Index: | |
| --- | --- |
| Dictionary Index | Rows |
| 0 | 1, 3 |
| 1 | 2 |

The algorithm 102 may optimize storage by storing smaller columns in serial persistency rather than unified persistency. By utilizing a single page chain instead of multiple chains, the algorithm conserves disk space for column and component storage. While unified persistency offers its advantages, the intent is to strategically employ it for specific scenarios. This approach may underscore the preference for serial persistency for 'smaller columns,' ensuring an efficient allocation of resources based on data size considerations. In some embodiments, in the query sequence, the initial action may involve dropping the table named "singleRowTable." Subsequently, a new table called "singleRowTable" may be created, featuring a single integer column named "a." In some embodiments, a data insertion operation may follow, where a value of 1 is inserted into the "a" column within the "singleRowTable." Finally, a delta merge operation may be performed on the "single-RowTable," consolidating any changes or updates made to the data. In some embodiments, an important contextual fact to consider is that columns designated as column loadable are also subject to being stored using the unified persistence format. This signifies that the specific attributes and characteristics of these columns contribute to their storage within the unified persistence framework. The attributes covered by the present disclosure may comprise, for example, IdAttribute, HashKey, and SpAttribute, etc. In some embodiments, IdAttribute pertains to data identifiers and hash keys. Notably, both data and/or index components are preserved in the same persistence format. This approach ensures a cohesive storage strategy for related data elements, contributing to efficient data retrieval and manipulation. In some embodiments, similar to the IdAttribute, the HashKey attribute is important in managing data storage. In this case, the data and/or index components are similarly stored within the same persistence format. This unified approach underscores the significance of maintaining data coherence and accessibility. In some embodiments, SpAttribute introduces a unique storage paradigm. Its components comprise Data, Dictionary, and Index. In some embodiments, each of these components can be independently stored in different persistence formats. This flexible approach optimizes storage choices based on the characteristics and requirements of each component, allowing for tailored data management strategies. For example, for SpAttribute, if estimated serial size for data and index is less than minSizeForUnifiedStorage then choose serial persistency; if estimated serial size for dictionary is less than dictSizeToUsePagedStorage then choose serial persistency.

FIG. 2 depicts an example flowchart illustrating a process 200 for managing persistence format, according to one or more embodiments of the present disclosure. The process 200 may begin with operation 202, wherein the system provided herein may compute an estimated serial size (ES) for a dataset, for example, an incoming dataset 101 as shown in FIG. 1. In some embodiments, the dataset may be a table of data comprising various columns or components. The estimation of the serial size may comprise assessing the cumulative size of the data components within the dataset that are candidates for serialization. This computation may take into account factors such as the volume of individual components, the number of rows, and any associated metadata. The result of this operation provides a quantifiable measure of the space required to store the dataset in a serial persistence format. Following the estimation of the serial size, the process 200 may proceed to operation 204, where an estimated unified size (EU) for the same dataset is computed. This estimation process may analyze the dataset in a manner similar to the estimation of serial size but is tailored to the requirements of unified persistence format. In unified persistence, each data component is treated individually, and the estimated unified size considers the optimal storage space needed to accommodate each component separately. This operation provides valuable insights into the space utilization characteristics when using the unified persistence format for the dataset.

The process 200 may then proceed to operation 206, wherein a dynamic selection process may take place, based at least in part on a predefined set of rules. These rules may define the conditions under which the system selects between the serial persistence format and the unified persistence format to store the dataset. The dynamic selection may involve evaluating the computed ES and EU, along with any other criteria specified by the rules. This dynamic decision-making process may ensure that the chosen persistence format aligns with the data's properties and the system's optimization objectives. In some embodiments, the dataset may comprise both complete columns and components of columns, with the choice of persistence format being made individually and/or independently for each component. For example, a process may involve assessing if a dictionary component within the dataset falls below a predetermined threshold size, and consequently storing that dictionary component in serial persistence format when its size satisfies this threshold condition. These actions align with the predefined rules, which involve identifying smaller columns by considering predetermined thresholds for column sizes.

Once the persistence format is dynamically determined and selected, the process 200 may proceed to operation 208, wherein the system may store the chosen persistence format as metadata associated with the stored dataset. This metadata captures the decision made during the dynamic selection process, ensuring that the appropriate format is retrieved when loading the dataset. In operation 210, the system may load the stored dataset when a loading request is received. In some embodiments, the system may reference the metadata associated with the dataset to ascertain the selected persistence format. This metadata-driven approach may guarantee the accurate loading of the dataset, adhering to the chosen format. Importantly, if the selected persistence format is the unified persistence format, a page-loadable format for efficient loading is available to the system. This tailored loading mechanism enhances retrieval performance, particularly when unified persistence is employed. In some embodiments, a page-loadable format for loading the dataset is not available if the selected persistence format for the dataset is the serial persistence format. In that case, the system may load the dataset in memory.

Figure 3:
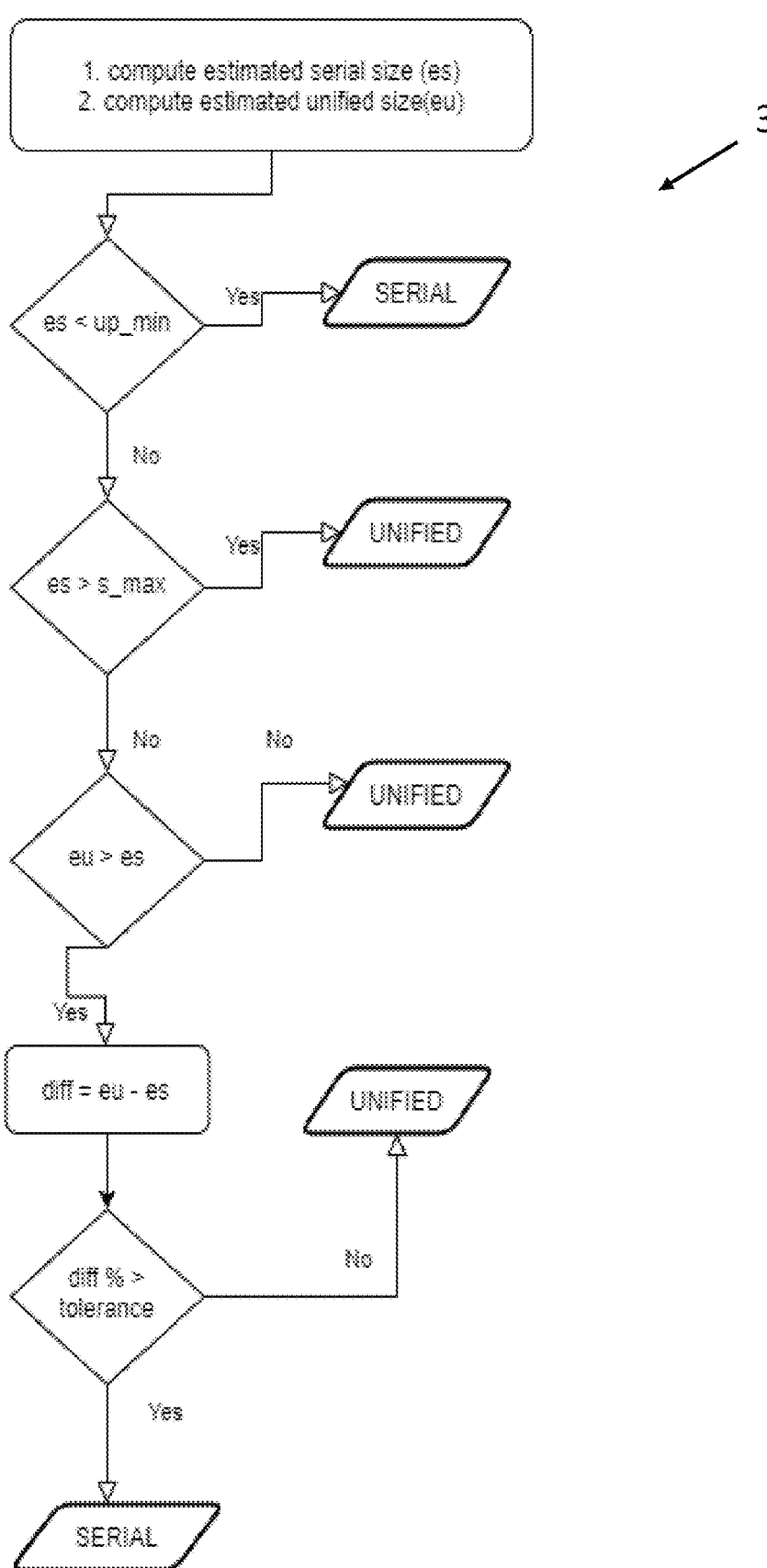
FIG. 3 depicts an example flowchart illustrating a process for rule-based decision making for managing persistence format, according to one or more embodiments of the present disclosure.

FIG. 3 depicts an example flowchart illustrating a process 300 for rule-based decision making for managing persistence format, according to one or more embodiments of the present disclosure. As shown by process 300, the system employs a set of predefined rules to guide its dynamic selection of data persistence formats. These rules may comprise several determinations. Initially, the system may assess whether the estimated serial size (ES) falls below a minimum threshold designated for unified storage. If met, the system opts for the serial persistence format. Conversely, if the ES surpasses a maximum size threshold designed for serial storage, the system promptly shifts to the unified persistence format. Furthermore, the system may conduct a strategic comparison between the ES and the estimated unified size (EU), opting for the unified format if the ES exceeds EU. In some embodiments, the system may compute the percentage difference between ES and EU, favoring the unified persistence format if the percentage difference is within a predetermined threshold. The culmination of these rules facilitates the system's intelligent selection of the most appropriate persistence format, ensuring efficient storage and retrieval based on the dataset's intrinsic characteristics.

In some embodiments, the system may detect a scenario where the minimum size threshold intended for unified storage exceeds the maximum size threshold designated for serial storage. Upon recognizing this scenario, the system may promptly generate an error signal, alerting stakeholders to the configuration mismatch. In some embodiments, to rectify the situation, the system may initiate a reconfiguration request specifically tailored for dynamic format selection. This diligent process may ensure that unexpected discrepancies are addressed, guaranteeing the integrity and effectiveness of the persistence format selection mechanism.

Figure 4:
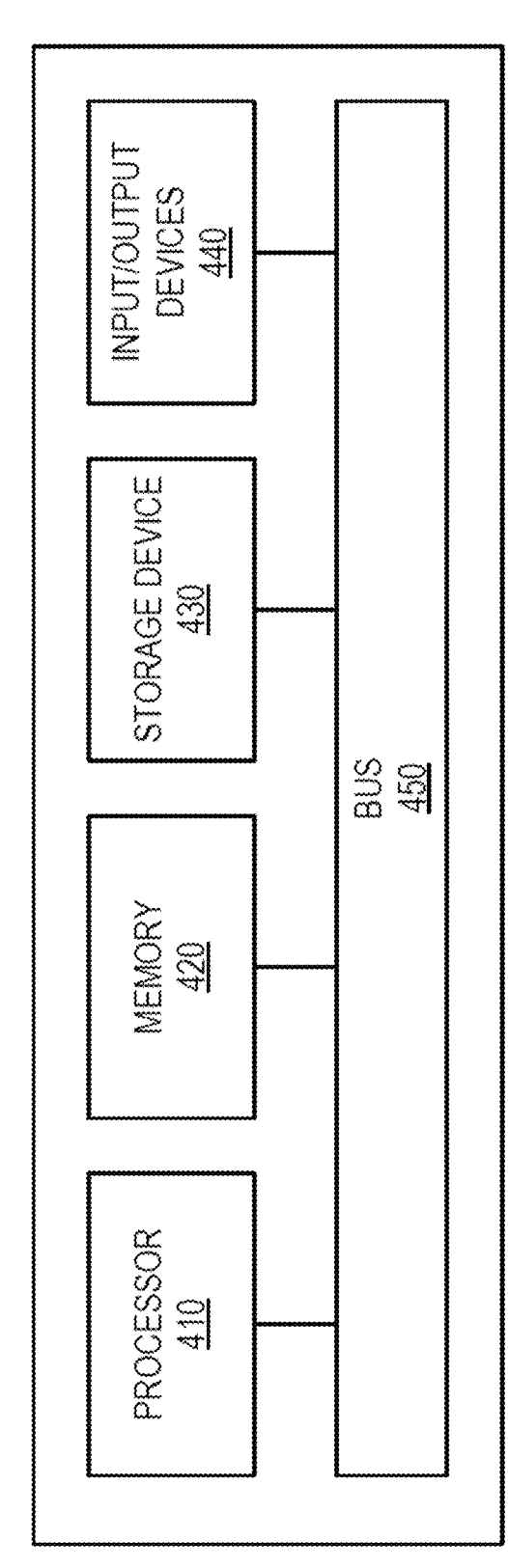
FIG. 4 depicts a block diagram for a database management system, in accordance with some example embodiments.

FIG. 4 depicts a block diagram illustrating a computing system 400 consistent with implementations of the current subject matter. Referring to FIGS. 1, 2A-B, and 3, the computing system 400 can be used to implement the computing platform 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the computing platform 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Evaluation Setup

In some embodiments, the evaluation setup may entail an in-depth evaluation through a Delta merge operation performed on a column loadable table. The evaluation may comprise three distinct configurations, each embracing random row counts spanning from 1 to 100 million and data sizes ranging from 4 KB to 1-2 GB. Essential thresholds may include a minimum size threshold of 32 MB (for Id and Hash attributes), 16 MB (for SpAttribute), and a dictionary size threshold of 4 KB for paged storage usage. The three configurations comprise: enabling unified persistency while disabling smart paging, disabling both unified and smart paging persistency, and enabling both unified persistency and smart paging for adaptive selection between serial and unified formats. This comprehensive setup may empower a thorough analysis of persistence formats and their implications across varying dataset characteristics and configuration choices.

Figure 5:
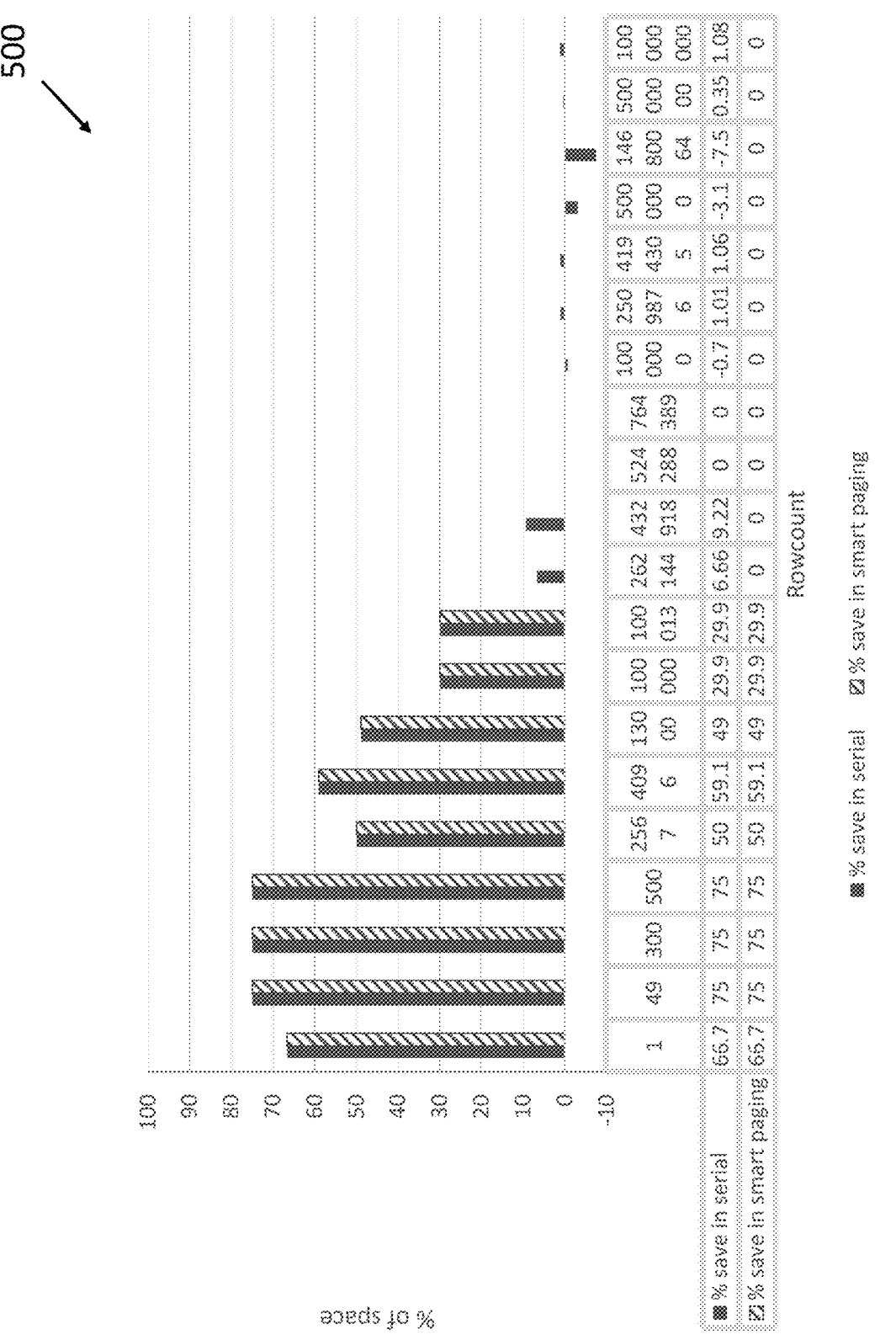
FIG. 5 depicts a diagram illustrating a persistence format management evaluation result for HashKey Space Save Percentage, according to one or more embodiments of the present disclosure.
Figure 6:
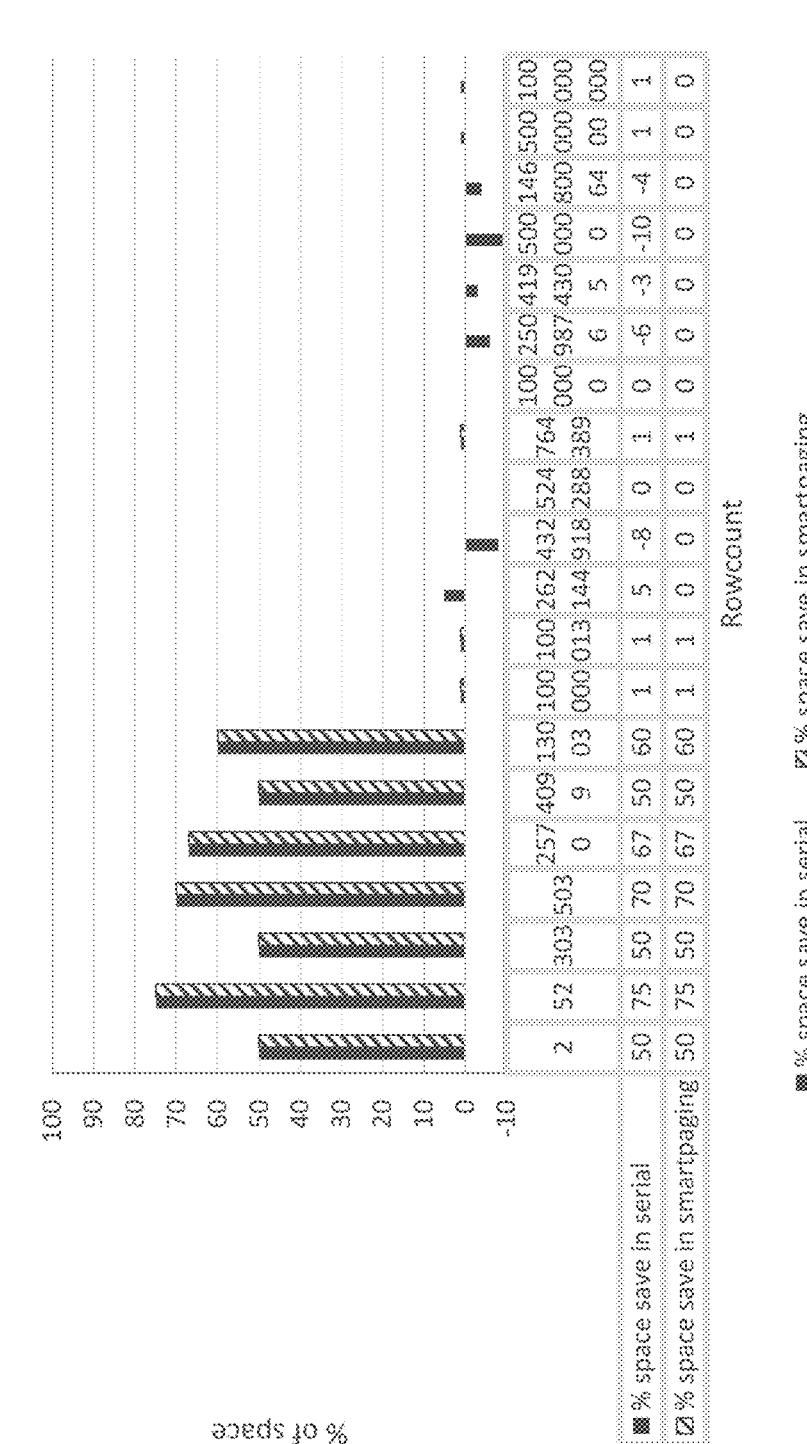
FIG. 6 depicts a diagram illustrating a persistence format management evaluation result for IdAttribute Space Save Percentage, according to one or more embodiments of the present disclosure.
Figure 7:
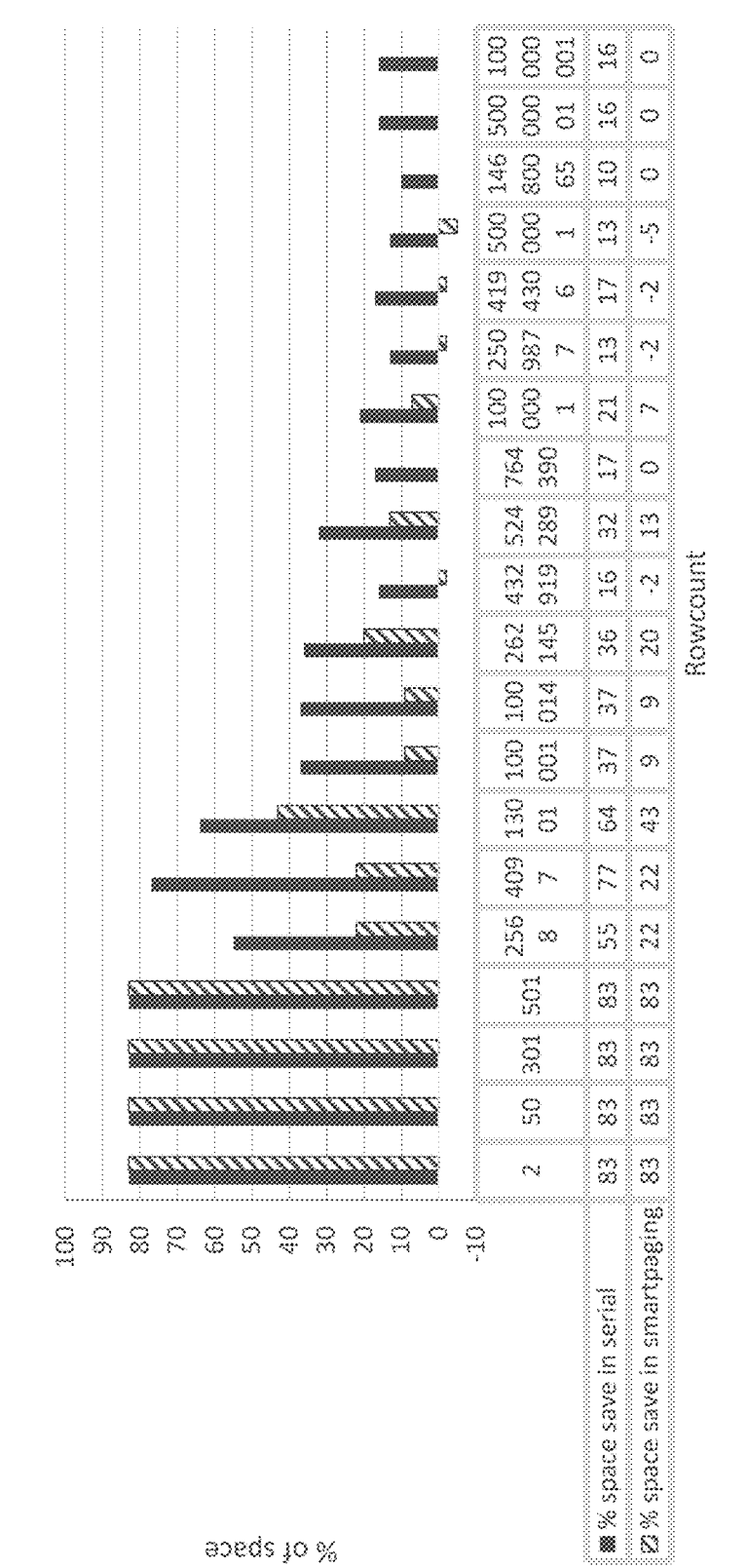
FIG. 7 depicts a diagram illustrating a persistence format management evaluation result for SpAttribute Space Save Percentage, according to one or more embodiments of the present disclosure.
Figure 8:
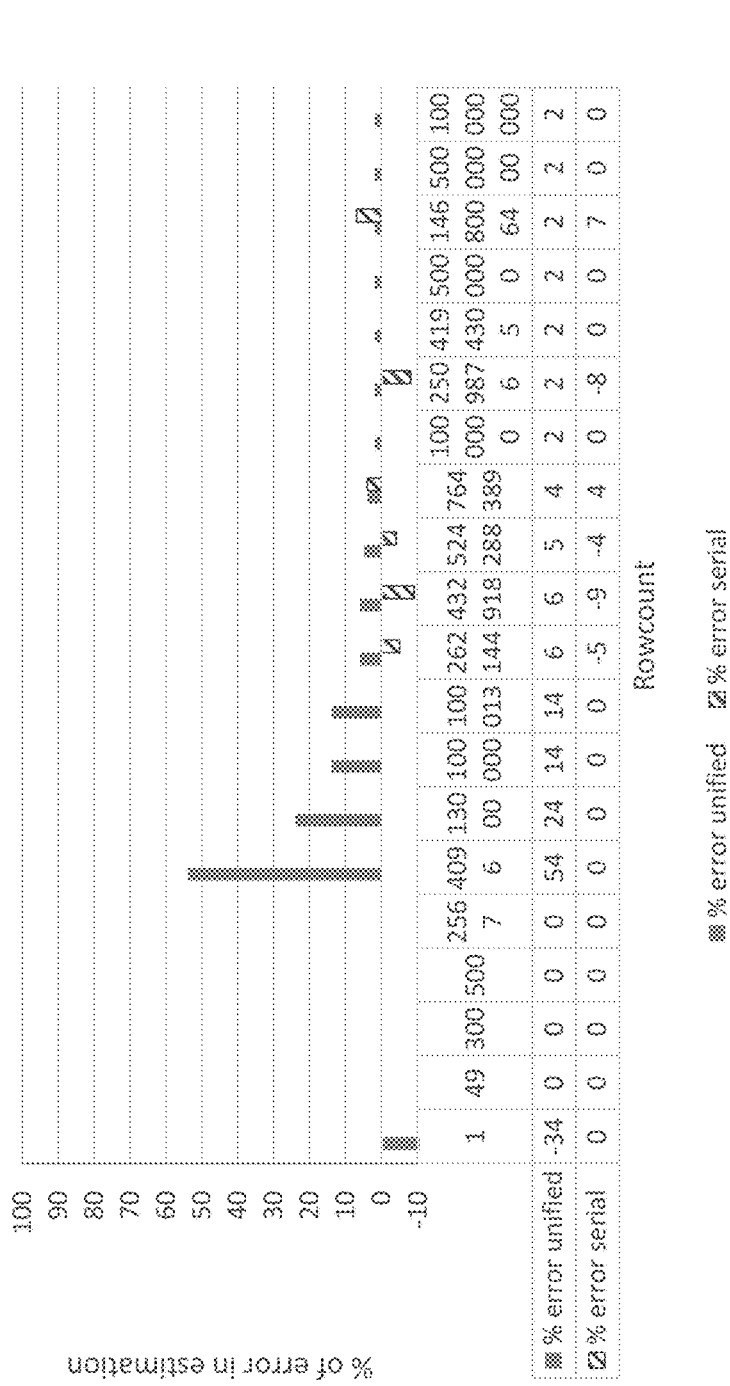
FIG. 8 depicts a diagram illustrating an estimations to be improved, by HashKey Estimation Error Presentative, according to one or more embodiments of the present disclosure.

FIG. 5 depicts a diagram illustrating a persistence format management evaluation result for HashKey Space Save Percentage, according to one or more embodiments of the present disclosure. It provides insights into the space-saving efficiency achieved through the management of HashKey attributes, shedding light on the optimization of storage utilization. FIG. 6 depicts a diagram illustrating a persistence format management evaluation result for IdAttribute Space Save Percentage, according to one or more embodiments of the present disclosure. This visual representation offers an overview of the space-saving performance achieved in managing IdAttribute data, highlighting the effectiveness of the system in conserving storage resources. FIG. 7 depicts a diagram illustrating a persistence format management evaluation result for SpAttribute Space Save Percentage, according to one or more embodiments of the present disclosure. It provides a detailed perspective on the space-saving outcomes in the management of SpAttribute components, emphasizing the adaptability of the system's storage strategies. FIG. 8 depicts a diagram illustrating an estimations to be improved, by HashKey Estimation Error Presentative, according to one or more embodiments of the present disclosure. Specifically, it illustrates estimations that can be enhanced, with a particular emphasis on HashKey Estimation Error Presentative. This visual aid highlights opportunities for refinement in the estimation processes, contributing to enhanced data storage efficiency. FIG. 9 depicts a comparison between an implementation without the data persistence formats management functionality and an implementation with the data persistence formats management functionality. As shown in FIG. 9, element 902 denotes a MAIN_PHYSICAL_SIZE for an implementation without the data persistence formats management functionality, and element 906 denotes a MAIN_PHYSICAL_SIZE for an implementation with the data persistence formats management functionality. As shown in FIG. 9, the MAIN_PHYSICAL_SIZE for element 902 (as an example, 8192 unit) is significantly larger than the MAIN_PHYSICAL_SIZE for element 906 (as an example, 4096 unit), which may further emphasize the data persistence formats management's contribution to enhanced data storage efficiency. Additionally or alternatively, element 904 denotes a MAIN_PHYSICAL_SIZE_IN_PAGE_LOADABLE for an implementation without the data persistence formats management functionality, and element 908 denotes a MAIN_PHYSICAL_SIZE_IN_PAGE_LOADABLE for an implementation with the data persistence formats management functionality. As shown in FIG. 9, the MAIN_PHYSICAL_SIZE_IN_PAGE_LOADABLE for element 904 (as an example, 4096 unit) is significantly larger than the MAIN_PHYSICAL_SIZE_IN_PAGE_LOADABLE for element 908 (as an example, 0 unit), which may further emphasize the data persistence formats management's contribution to enhanced data storage efficiency.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system for managing data persistence formats in a computing system, comprising:

at least one data processor; and at least one memory result in operations comprising:

computing an estimated serial size (ES) for a dataset;

computing an estimated unified size (EU) for the dataset;

selecting, based at least in part on a predefined set of rules, between a serial persistence format and a unified persistence format to store the dataset, wherein the selection is based at least in part on the computed estimated serial size and the computed estimated unified size;

storing the selected persistence format in a metadata associated with the stored dataset; and in response to a loading request, loading the stored dataset by referring to the metadata.

Example 2: The system of Example 1, wherein a page-loadable format for loading the stored data set is available if the selected persistence format for the stored dataset is the unified persistence format, and the page-loadable format for loading the dataset is not available if the selected persistence format for the dataset is the serial persistence format.

Example 3: The system of any of Examples 1-2, wherein the predefined set of rules comprises:

a determination of whether the ES is less than a minimum size threshold for unified storage, and if so, selecting the serial persistence format;

a determination of whether the ES is greater than a maximum size threshold for serial storage, and if so, selecting the unified persistence format;

a comparison of the ES and the EU, and selecting the unified persistence format if the ES is greater than the EU; and a calculation of a percentage difference between the ES and the EU, and selecting the unified persistence format if the percentage difference is within a predetermined threshold.

Example 4: The system of any of Examples 1-3, wherein the operations further comprises:

detecting a scenario where the minimum size threshold for unified storage is greater than the maximum size threshold for serial storage; and generating a reconfiguration request for dynamic format selection.

Example 5: The system of any of Examples 1-4, wherein the dataset includes columns and components of columns, and the selection of the persistence format is determined independently for each component.

Example 6: The system of any of Examples 1-5, wherein the operations further comprise:

determining if a dictionary component of the dataset has a size that is below a dictionary sized threshold, and storing the dictionary component to serial persistence format in response to the size below the dictionary size threshold.

Example 7: The system of any of Examples 1-6, wherein the predefined set of rules comprises identifying small columns based on predetermined thresholds for column sizes.

Example 8: A computer-implemented method, comprising:

computing an estimated serial size (ES) for a dataset;

computing an estimated unified size (EU) for the dataset;

selecting, based at least in part on a predefined set of rules, between a serial persistence format and a unified persistence format to store the dataset, wherein the selection is based at least in part on the computed estimated serial size and the computed estimated unified size;

storing the selected persistence format in a metadata associated with the stored dataset; and in response to a loading request, loading the stored dataset by referring to the metadata.

Example 9: The method of Example 8, wherein a page-loadable format for loading the stored data set is available if the selected persistence format for the stored dataset is the unified persistence format, and the page-loadable format for loading the dataset is not available if the selected persistence format for the dataset is the serial persistence format.

Example 10: The method of any of Examples 8-9, wherein the predefined set of rules comprises:

a determination of whether the ES is less than a minimum size threshold for unified storage, and if so, selecting the serial persistence format;

a determination of whether the ES is greater than a maximum size threshold for serial storage, and if so, selecting the unified persistence format;

a comparison of the ES and the EU, and selecting the unified persistence format if the ES is greater than the EU; and a calculation of a percentage difference between the ES and the EU, and selecting the unified persistence format if the percentage difference is within a predetermined threshold.

Example 11: The method of any of Examples 8-10, wherein the operations further comprises:

detecting a scenario where the minimum size threshold for unified storage is greater than the maximum size threshold for serial storage; and generating a reconfiguration request for dynamic format selection.

Example 12: The method of any of Examples 8-11, wherein the dataset includes columns and components of columns, and the selection of the persistence format is determined independently for each component.

Example 13, The method of any of Examples 8-12, wherein the operations further comprise:

determining if a dictionary component of the dataset has a size that is below a dictionary sized threshold, and storing the dictionary component to serial persistence format in response to the size below the dictionary size threshold.

Example 14: The method of any of Examples 8-13, wherein the predefined set of rules comprises identifying small columns based on predetermined thresholds for column sizes.

Example 15: A non-transitory computer-readable medium storing instructions, which when executed by at least one data processor, result in operations comprising:

computing an estimated serial size (ES) for a dataset;

computing an estimated unified size (EU) for the dataset;

selecting, based at least in part on a predefined set of rules, between a serial persistence format and a unified persistence format to store the dataset, wherein the selection is based at least in part on the computed estimated serial size and the computed estimated unified size;

storing the selected persistence format in a metadata associated with the stored dataset; and in response to a loading request, loading the stored dataset by referring to the metadata.

Example 16: The non-transitory computer-readable medium of Example 15, wherein a page-loadable format for loading the stored data set is available if the selected persistence format for the stored dataset is the unified persistence format, and the page-loadable format for loading the dataset is not available if the selected persistence format for the dataset is the serial persistence format.

Example 17: The non-transitory computer-readable medium of any of Examples 15-16, wherein the predefined set of rules comprises:

a determination of whether the ES is less than a minimum size threshold for unified storage, and if so, selecting the serial persistence format;

a determination of whether the ES is greater than a maximum size threshold for serial storage, and if so, selecting the unified persistence format;

a comparison of the ES and the EU, and selecting the unified persistence format if the ES is greater than the EU; and a calculation of a percentage difference between the ES and the EU, and selecting the unified persistence format if the percentage difference is within a predetermined threshold.

Example 18: The non-transitory computer-readable medium of any of Examples 15-17, wherein the operations further comprises:

detecting a scenario where the minimum size threshold for unified storage is greater than the maximum size threshold for serial storage; and generating a reconfiguration request for dynamic format selection.

Example 19: The non-transitory computer-readable medium of any of Examples 15-18, wherein the dataset includes columns and components of columns, and the selection of the persistence format is determined independently for each component.

Example 20: The non-transitory computer-readable medium of any of Examples 15-19, wherein the predefined set of rules comprises identifying small columns based on predetermined thresholds for column sizes.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system for managing data persistence formats in a computing system, comprising:

at least one data processor; and at least one memory result in operations comprising:

computing an estimated serial size(ES) for a dataset by assessing a cumulative size of data components within the dataset;

computing an estimated unified size (EU) for the dataset by assessing an individual size of each of the data components separately;

selecting, based at least in part on a predefined set of rules, between a serial persistence format and a unified persistence format to store the dataset, wherein the selection is based at least in part on the computed estimated serial size and the computed estimated unified size;

storing the selected persistence format in a metadata associated with the stored dataset; and in response to a loading request, loading the stored dataset by referring to the metadata, wherein the predefined set of rules comprises:

a determination of whether the ES is less than a minimum size threshold for unified storage, and if so, selecting the serial persistence format;

a determination of whether the ES is greater than a maximum size threshold for serial storage, and if so, selecting the unified persistence format;

a comparison of the ES and the EU, and selecting the unified persistence format if the ES is greater than the EU; and a calculation of a percentage difference between the ES and the EU, and selecting the unified persistence format if the percentage difference is within a predetermined threshold.

2. The system of claim 1, wherein a page-loadable format for loading the stored data set is available if the selected persistence format for the stored dataset is the unified persistence format, and the page-loadable format for loading the dataset is not available if the selected persistence format for the dataset is the serial persistence format.

3. The system of claim 1, wherein the operations further comprises:

detecting a scenario where the minimum size threshold for unified storage is greater than the maximum size threshold for serial storage; and generating a reconfiguration request for dynamic format selection.

4. The system of claim 1, wherein the dataset comprises columns and components of columns, and the selection of the persistence format is determined independently for each component.

5. The system of claim 4, wherein the operations further comprise:

determining if a dictionary component of the dataset has a size that is below a dictionary sized threshold, and storing the dictionary component to serial persistence format in response to the size below the dictionary size threshold.

6. The system of claim 1, wherein the predefined set of rules comprises identifying small columns based on predetermined thresholds for column sizes.

7. A computer-implemented method, comprising:

computing an estimated serial size(ES) for a dataset by assessing a cumulative size of data components within the dataset;

computing an estimated unified size (EU) for the dataset by assessing an individual size of each of the data components separately;

selecting, based at least in part on a predefined set of rules, between a serial persistence format and a unified persistence format to store the dataset, wherein the selection is based at least in part on the computed estimated serial size and the computed estimated unified size;

storing the selected persistence format in a metadata associated with the stored dataset; and in response to a loading request, loading the stored dataset by referring to the metadata, wherein the predefined set of rules comprises:

a determination of whether the ES is less than a minimum size threshold for unified storage, and if so, selecting the serial persistence format;

a determination of whether the ES is greater than a maximum size threshold for serial storage, and if so, selecting the unified persistence format;

a comparison of the ES and the EU, and selecting the unified persistence format if the ES is greater than the EU; and a calculation of a percentage difference between the ES and the BU, and selecting the unified persistence format if the percentage difference is within a predetermined threshold.

8. The method of claim 7, wherein a page-loadable format for loading the stored data set is available if the selected persistence format for the stored dataset is the unified persistence format, and the page-loadable format for loading the dataset is not available if the selected persistence format for the dataset is the serial persistence format.

9. The method of claim 7, wherein the operations further comprises:

detecting a scenario where the minimum size threshold for unified storage is greater than the maximum size threshold for serial storage; and generating a reconfiguration request for dynamic format selection.

10. The method of claim 7, wherein the dataset comprises columns and components of columns, and the selection of the persistence format is determined independently for each component.

11. The method of claim 10, further comprising:

determining if a dictionary component of the dataset has a size that is below a dictionary sized threshold, and storing the dictionary component to serial persistence format in response to the size below the dictionary size threshold.

12. The method of claim 7, wherein the predefined set of rules comprises identifying small columns based on predetermined thresholds for column sizes.

13. A non-transitory computer-readable medium storing instructions, which when executed by at least one data processor, result in operations comprising:

computing an estimated serial size(ES) for a dataset by assessing a cumulative size of data components within the dataset;

computing an estimated unified size (EU) for the dataset by assessing an individual size of each of the data components separately;

selecting, based at least in part on a predefined set of rules, between a serial persistence format and a unified persistence format to store the dataset, wherein the selection is based at least in part on the computed estimated serial size and the computed estimated unified size;

storing the selected persistence format in a metadata associated with the stored dataset; and in response to a loading request, loading the stored dataset by referring to the metadata, wherein the predefined set of rules comprises:

a determination of whether the ES is less than a minimum size threshold for unified storage, and if so, selecting the serial persistence format;

a determination of whether the ES is greater than a maximum size threshold for serial storage, and if so, selecting the unified persistence format;

a comparison of the ES and the EU, and selecting the unified persistence format if the BS is greater than the BU; and a calculation of a percentage difference between the ES and the EU, and selecting the unified persistence format if the percentage difference is within a predetermined threshold.

14. The non-transitory computer-readable medium of claim 13, wherein a page-loadable format for loading the stored data set is available if the selected persistence format for the stored dataset is the unified persistence format, and the page-loadable format for loading the dataset is not available if the selected persistence format for the dataset is the serial persistence format.

15. The non-transitory computer-readable medium of claim 13, wherein the operations further comprises:

detecting a scenario where the minimum size threshold for unified storage is greater than the maximum size threshold for serial storage; and generating a reconfiguration request for dynamic format selection.

16. The non-transitory computer-readable medium of claim 13, wherein the dataset comprises columns and components of columns, and the selection of the persistence format is determined independently for each component.

17. The non-transitory computer-readable medium of claim 13, wherein the predefined set of rules comprises identifying small columns based on predetermined thresholds for column sizes.

\* \* \* \* \*